United States Patent Office 3,129,155
Patented Apr. 14, 1964

3,129,155
METHOD OF PRODUCING CYCLOALKAN-ONEOXIME HYDROCHLORIDES
Yoshikazu Ito and Ryoh Endoh, Nagoya-shi, Aichi-ken, Japan, assignors to Toyo Rayon Kabushiki Kaisha, Tokyo, Japan, a corporation of Japan
No Drawing. Filed Sept. 20, 1961, Ser. No. 139,352
Claims priority, application Japan Sept. 26, 1960
8 Claims. (Cl. 204—162)

This invention relates to a method of producing cycloalkanoneoxime hydrochlorides. More particularly, it relates to a method of producing the foregoing compounds photochemically.

An object of this invention is to provide an industrial method of producing efficiently a cycloalkanoneoxime hydrochloride and ε-caprolactam, the latter being prepared by Beckmann's rearrangement of a cycloalkanoneoxime.

Other objects and advantages of the invention will become apparent from the following detailed description.

That by reacting a nitrosation agent with a cycloalkanone under irradiation by an actinic light it is possible to produce the corresponding oxime or oxime hydrochloride is known.

Also, as methods of producing photochemically an oxime hydrochloride the following practices are known:

(a) A method in which NOCl gas and HCl gas are fed to a photoreaction zone of a vessel containing cycloalkane.

(b) A method in which cycloalkane in a photoreaction zone is saturated in advance with HCl and thereafter nitrosyl chloride is fed to this zone.

While these known methods aim to raise the utilization rate of light preventing as much as possible the occurrence of side reactions by regulating the quantity of nitrosyl chloride fed in accordance with the density of the light in the photoreaction zone and the reaction rate, in actual practice the complete prevention of side reactions over the whole photoreaction zone is difficult for the following reasons.

When the quantity of nitrosyl chloride fed to the photoreaction zone becomes excessive and in consequence the concentration of the nitrosyl chloride in the cycloalkanes becomes excessive, the bis-nitroso-cycloalkanes, cycloalkanoneoximes or the oxime hydrochlorides formed in the photoreaction zone react further with nitrosyl chloride and are converted to chloronitroso cycloalkanes and other chlorinated products, thus not only lowering the yield of the cycloalkanoneoxime but polluting the photoreaction zone extremely as to lower its light utilization rate. On the other hand, in case the nitrosyl chloride concentration of the cycloalkane is extremely low, while the occurrence of side reactions can be controlled, as the reaction does not proceed efficiently and the light utilization rate is lowered, it is not possible to carry out a stable, continuous reaction over a long period of hours.

As a result of researches made concerning the foregoing points, we found that the concentration of nitrosyl chloride dissolved in cycloalkane in the photoreaction zone could be controlled by the reaction temperature and the pressure of the nitrosyl chloride gas fed; and consequently that if these two factors were held within a certain range, the nitrosyl chloride concentration of the cycloalkane could be maintained constant so that no matter how much in excess the nitrosyl chloride gas is fed, the concentration of nitrosyl chloride in the cycloalkane would not rise, and also that the nitrosyl chloride which does not dissolve in the cycloalkane contributed hardly if any to the photochemical nitrosation of the cycloalkane.

On the basis of this discovery when researches were conducted regarding the reaction for producing cycloalkaneoxime hydrochlorides by photochemically reacting cycloalkanes with nitrosyl chloride in the presence of hydrogen chloride, it was found that if the reaction was carried out with the partial pressure of the nitrosyl chloride gas fed being 5–80 mm. Hg and the reaction temperature, $-10°$ to $50°$ C., practically no side reactions occurred, cycloalkanoneoxime hydrochlorides of excellent quality were obtained with good yield, and the attainment of the maximum in the utilization rate of the light was possible.

If in this operation the partial pressure of the nitrosyl chloride becomes less than 5 mm. Hg, reaction does not fully take place, and on the other hand if the partial pressure exceeds 80 mm. Hg side reactions occur. Therefore, it is necessary that the partial pressure of the nitrosyl chloride be held in the range of 5 to 80 mm. Hg, about 20 to 60 mm. Hg being particularly preferred. While the temperature may be in the range of $-10°$ C. to $50°$ C., in view of the fact that this reaction is an exothermic reaction and also that side reactions other than the photoreaction occur when the reaction temperature is high the temperature from $-10°$ C. to $20°$ C. is particularly desirable.

In case the cycloalkane should freeze at this reaction temperature, it is preferred that the freezing be prevented by the addition of an inert diluent such as benzene, carbon tetrachloride, etc.; and then the gas containing nitrosyl chloride be introduced.

According to the invention cycloalkanoneoxime hydrochlorides are produced continuously over a long period of hours under stable operating conditions.

At the reaction temperature and the partial pressure of nitrosyl chloride at which the invention is practiced it is presumed that the concentration of nitrosyl chloride is about 0.03 to 0.2% by weight. In actual operations, as the nitrosyl chloride in the cycloalkanone is consumed simultaneously upon its being fed, the determination of its accurate concentration is impossible.

As the cycloalkanes having 5 to 8 carbon atoms that are used in the invention there can be named such as cyclopentane, cyclohexane, cyclooctane, etc.

In the invention the nitrosyl chloride is fed as a gas containing nitrosyl chloride by mixing with hydrogen chloride and optionally with an inert gas such as carbon dioxide gas and nitrogen. While the pressure of this mixed gas may be fed at atmospheric pressure, under elevated pressure or reduced pressure, since it is to be blown into the cycloalkane, slight application of pressure is desirable. In case hydrogen chloride has not been caused to be absorbed in advance by the cycloalkane it is desirable that hydrogen chloride in the proportion of more than 2 mols to each mol of nitrosyl chloride be added to this gas containing nitrosyl chloride, although the amount may be less than this.

The blowing in of this gas containing nitrosyl chloride to the cycloalkane is suitably performed by a method which renders the contact of liquid and gas good over the whole of the photoreaction zone, and as one example of accomplishing this there is mentioned the method in which blowing-in orifices are provided in multiple stages in a vertical direction whereby the gas is blown in as finely separated bubbles. The quantity of gas blown in is preferably an amount about 150–300% of the theoretical consumption of nitrosyl chloride at the reaction temperature used.

EXAMPLE 1

A jacketed cylindrical reactor with a glass-lined interior having an inside diameter of 500 mm. and length of 700 mm. and fitted with a withdrawal outlet at its bottom was provided in its central part with a 5 kw. high pressure mercury lamp equipped with an exterior cooling pipe of glass. To this was added about 30 liters of cyclohexane, and the uppermost point of the light emitting part of the mercury lamp was made to be present in the cyclohexane liquid. A mixed gas of nitrosyl chloride and hydrogen chloride of which the partial pressure of the nitrosyl chloride was 40 mm. Hg was fed from the lower end of the mercury lamp under atmospheric pressure at the rate of 55 liters per minute while at the same time the temperature of the reaction mixture was maintained at 10° C. by means of cold water circulating in the jacket of the reaction vessel. In about 20 minutes after beginning the blowing in of gas oil-like cyclohexanoneoxime hydrochloride started separating to the bottom of the reaction vessel. This was continuously drawn off while at the same time the reaction vessel was replenished with cyclohexane so as to maintain the liquid level in the vessel constant. The quantity of oil-like substance drawn off after 20 hours of continuous reaction was 21.8 kg. This product was then neutralized in accordance with accepted practices, and 12.2 kg. of cyclohexanoneoxime crystals (melting point 87–88° C.) were obtained. In this case the quantity of cyclohexane consumed was 12.7 liters and the yield of the cyclohexanoneoxime on the basis of the cyclohexane consumed amounted to 92%.

EXAMPLE 2

The photoreaction apparatus as used in Example 1 was charged with about 30 liters of cyclooctane. To this was fed as in Example 1 continuously at the rate of 80 liters per minute a mixed gas consisting of nitrosyl chloride and hydrogen chloride of which the partial pressure of the nitrosyl chloride was 35 mm. Hg while maintaining the temperature of the reaction mixture at 20° C. In 15 minutes after the blowing in of the gas was begun oil-like cyclooctanoneoxime hydrochloride started to separate, and after 10 hours the quantity of the oil-like substance drawn off amounted to 13.4 kg. When this was neutralized in accordance with accepted practices 7.9 kg. of cyclooctanoneoxime having a melting point of 41–42° C. were obtained. The yield of the cyclooctanoneoxime as calculated from the cyclooctane consumed (8.0 liters) was 93.5%.

EXAMPLE 3

The photoreaction apparatus as used in Example 1 was charged with 30 liters of cyclohexane. To this was fed as in Example 1 continuously under about atmospheric pressure at the rate of 90 liters per minute a mixed gas consisting of nitrosyl chloride, nitrogen and hydrogen chloride of which the partial pressure of nitrosyl chloride was 35 mm. Hg and the partial pressure of nitrogen was 300 mm. Hg while maintaining the temperature of the reaction liquid at 10° C. After 15 minutes from the beginning of blowing-in the gas oil-like substance started to separate, and after 20 hours the quantity of the oil-like substance obtained amounted to 22 kg. When this was neutralized in accordance with accepted practices 12.5 kg. of cyclohexanoneoxime were obtained. The quantity of the cyclohexane consumed was 13.1 liters and the yield of the cyclohexanoneoxime on the basis of the cyclohexane consumed amounted to 91%.

*Examples for Comparison*

When the photoreaction apparatus of Example 1 was used and the partial pressure of the nitrosyl chloride of a mixed gas of nitrosyl chloride and hydrogen chloride (total pressure 800 mm. Hg) fed was varied within the range of 35 to 200 mm. Hg, the yield of cyclohexanoneoxime hydrochloride and the production of by-products in correspondence with the various rates at which the mixed gas was fed were as in the following table. It is apparent from the results obtained that in those cases when the partial pressure of nitrosyl chloride was higher than 80 mm. Hg, there was a tendency that as the rate at which the mixed gas was fed increased the yield of oximes decreased while the production of by-products increased markedly.

| Partial pressure of nitrosyl chloride (mm. Hg) | Quantity of mixed gas fed (l./min.) | Net quantity of nitrosyl chloride fed (l./min.) | Yield of cyclohexanone-oxime Hydrochloride (kg./10 hr.) | Chloronitroso cyclohexane formed (kg./10 hr.) | Other high boiling point by-products formed (kg./10 hr.) |
|---|---|---|---|---|---|
| 200 | 5 | 1.25 | 3.67 | 0.35 | .020 |
| 200 | 10 | 2.50 | 4.62 | 0.88 | 0.54 |
| 200 | 20 | 5.00 | 4.05 | 1.47 | 1.20 |
| 200 | 30 | 7.50 | 1.76 | 1.85 | 2.25 |
| 100 | 10 | 1.25 | 3.48 | 0.07 | 0.04 |
| 100 | 20 | 2.50 | 5.26 | 0.38 | 0.14 |
| 100 | 40 | 5.00 | 3.11 | 1.59 | 0.94 |
| 100 | 60 | 7.50 | 2.57 | 2.36 | 1.80 |
| 80 | 10 | 1.05 | 3.51 | 0.05 | 0.04 |
| 80 | 20 | 2.11 | 4.86 | 0.12 | 0.06 |
| 80 | 40 | 4.22 | 5.75 | 0.27 | 0.10 |
| 80 | 60 | 6.32 | 6.04 | 0.39 | 0.45 |
| 50 | 20 | 1.25 | 3.06 | 0.03 | 0.02 |
| 50 | 40 | 2.50 | 4.85 | 0.05 | 0.02 |
| 50 | 60 | 3.75 | 6.27 | 0.07 | 0.05 |
| 50 | 80 | 5.00 | 6.14 | 0.28 | 0.13 |
| 35 | 20 | 0.88 | 2.40 | 0.02 | 0.01 |
| 35 | 40 | 1.75 | 4.31 | 0.03 | 0.02 |
| 35 | 60 | 2.62 | 6.60 | 0.05 | 0.04 |
| 35 | 80 | 3.50 | 6.74 | 0.06 | 0.05 |
| 35 | 100 | 4.37 | 6.78 | 0.06 | 0.07 |

Having thus described the invention, what is claimed is:

1. A method of producing cycloalkanoneoxime hydrochlorides photochemically which comprises, in reacting photochemically a cycloalkane with nitrosyl chloride in the presence of hydrogen chloride, continuously feeding to the reaction zone a gas containing nitrosyl chloride at a temperature ranging from −10° to 50° C., said nitrosyl chloride having a partial pressure ranging from 5 to 80 mm. Hg.

2. A method as defined in claim 1 wherein as said gas containing nitrosyl chloride a mixed gas or nitrosyl chloride and hydrogen chloride is used.

3. A method as defined in claim 1 wherein as said gas containing nitrosyl chloride a gas containing nitrosyl chloride, hydrogen chloride, and another inert gas besides the foregoing is used.

4. A method as defined in claim 3 wherein said inert gas is selected from the group consisting of carbon dioxide gas and nitrogen.

5. A method as defined in claim 1 wherein the partial pressure of the nitrosyl chloride of said gas containing nitrosyl chloride is from 20 to 60 mm. Hg.

6. A method as defined in claim 1 wherein the reaction temperature is from −10° C. to 20° C.

7. A method as defined in claim 1 wherein as said cycloalkane, cyclohexane is used.

8. A method as defined in claim 1 wherein as said cycloalkane, cyclooctane is used.

References Cited in the file of this patent

UNITED STATES PATENTS 2,879,215     Reppe et al.     May 24, 1959
2,945,065     Donaruma     July 12, 1960